Figure 1:
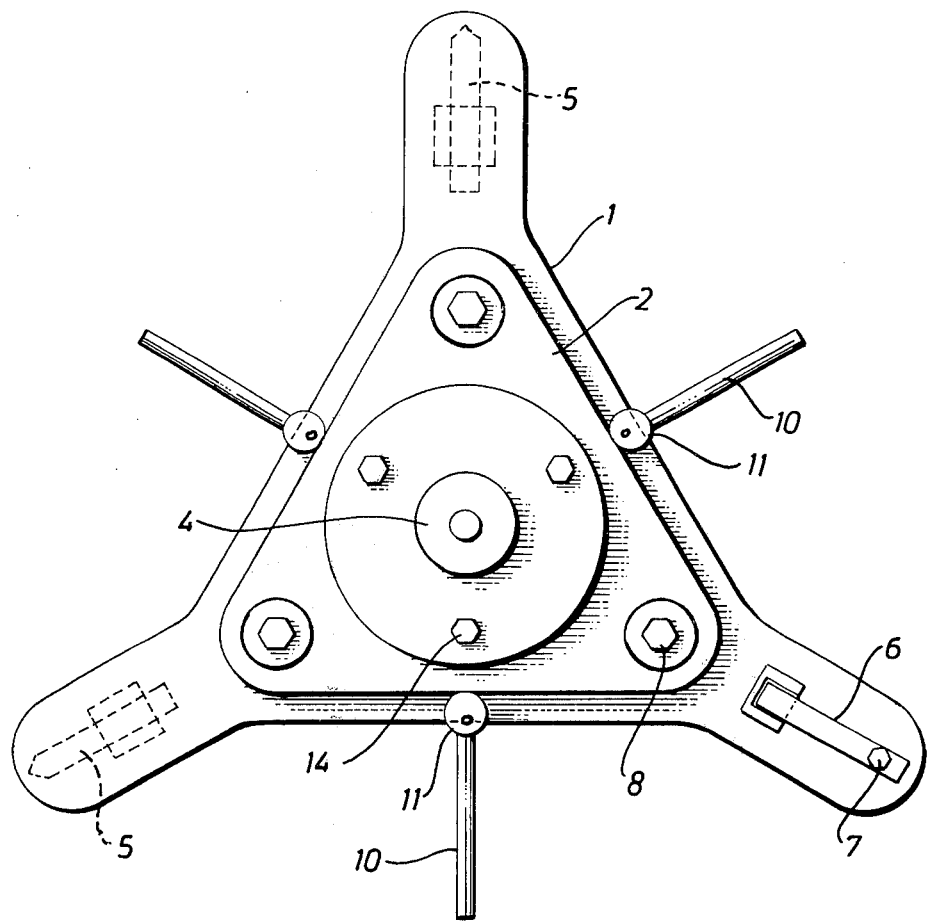

United States Patent [19]

Hörvallius

[11] 4,011,659

[45] Mar. 15, 1977

[54] CENTERING APPARATUS

[75] Inventor: Torgny William Hörvallius, Gavle, Sweden

[73] Assignee: Aktiebolaget SAMEFA, Stockholm, Sweden

[22] Filed: Apr. 16, 1975

[21] Appl. No.: 568,732

[30] Foreign Application Priority Data

Apr. 23, 1974 Sweden .................... 7405412

[52] U.S. Cl. .................... 33/203; 33/180 AT; 33/203.18; 33/286

[51] Int. Cl.² .................... G01B 5/24

[58] Field of Search .......... 33/180 AT, 191, 185 V, 33/181 AT, 180 R, 203, 203.18, 286, 193

[56] References Cited

UNITED STATES PATENTS

| 2,882,607 | 4/1959 | Binder | 33/203 |
| 3,402,905 | 9/1968 | McMillan | 33/203.18 |

Primary Examiner—Richard E. Aegerter
Assistant Examiner—Willis Little
Attorney, Agent, or Firm—Woodhams, Blanchard and Flynn

[57] ABSTRACT

An apparatus is provided for bringing a holder for an indicating member, e.g. a mirror, scale etc. component of measuring means, into exact coaxiality with a rotatable body, such as a vehicle wheel or wheel shaft, for checking the axis position and direction of the body. The apparatus comprises three main parts, viz. (a) a base member attachable to the body to be checked, (b) an intermediate member displaceable on the base member, and (c) said holder, which is tiltably carried on the intermediate member. Displacement of the intermediate member on the base member supplemented by tilting of the holder on the intermediate member readily brings the axis of the holder with its indicating member into accurate alignment with the axis of the body.

9 Claims, 2 Drawing Figures

CENTERING APPARATUS

The present invention relates to an apparatus for coaxial adjustment, in relation to the centerline of an elongated body, e.g. a shaft or shaft end, of a holder for a detail incorporated in measuring equipment for checking direction or position of the body. The apparatus is preferably suited for use in checking adjustment and position of the wheels on a vehicle.

Crooked and incorrectly adjusted or attached axles on a vehicle result in abnormal tire wear, and the vehicle will be difficult to steer and uncertain to manoeuvre in traffic. Such faults should therefore be put right immediately, and methods and apparatuses for checking axles and wheel settings have also been in use for a long time. A usual but primitive method is to dismantle wheels, brake shoes, brake drums and bearings etc, whereafter it is possible, for example, to determine tracking of a rear axle by plumbing down points from the axle ends onto a carefully leveled floor, and marking with chalk crosses on the floor. With string or a measuring tape, measurements are then taken to a center point on the front portion of the chassis, frame or front axle attachment. Such measurement can take three or four hours, and to check whether an axle is deformed can take eight or ten hours. This means that many vehicle owners hesitate effectively to check their vehicles in this respect, and they are thereby caused increased costs due to wear on tires and other details as well as exposing themselves and others to risks when driving the vehicle. There are, however, apparatuses of greater development for checking wheel settings and axles. In a known apparatus which is intended for adjustment in a geometrical wheel plane, a tensioning device is used which requires hydraulic operation with a diaphragm pump, and driving rollers are furthermore required to put the wheel in motion, adjustment of which is to be checked. Special apparatus must be available for carrying out a check in this case.

There are also other devices on the market for the purpose, but they are usually not completely developed and are therefore difficult to work with.

In contradistinction to the mentioned previously known apparatuses, the apparatus according to the invention is simple to manufacture, which means that it can be made available at a low price. It is also robust and easy to use and requires no pumps or driving rollers. Neither is one dependent on the nature of the ground or floor at the place where a check is to be carried out. Examining an axle or axle end can be carried out in an hour at most, and adjustment of tracking can be done in an hour. The costs for a check will therefore be small. It is thus possible for many checks per day to be managed in one workshop, and this should result in increased traffic safety. The apparatus according to the invention has the distinguishing features set forth in the accompanying claims.

Figure 2:
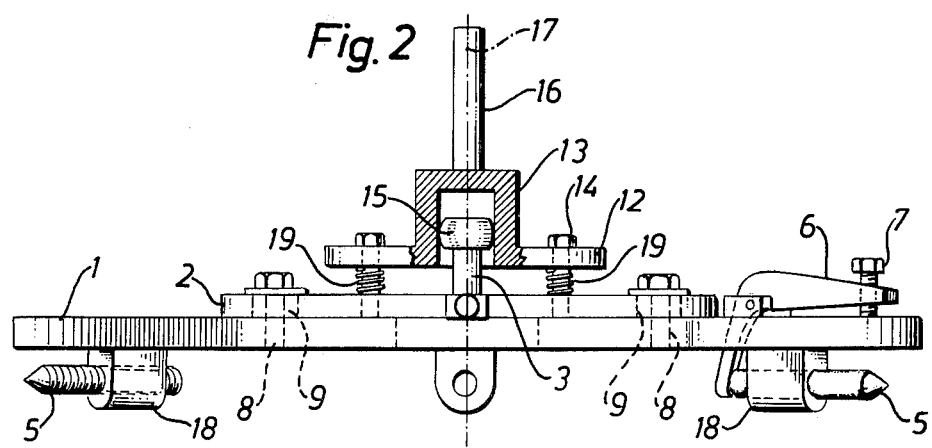

A preferred embodiment of the invention will now be more closely described with reference to the enclosed drawing, where FIG. 1 shows the device seen in the direction of the centerline and FIG. 2 shows it seen at right-angles thereto. In FIG. 2 the cylindrical tube is cut through to show the guiding portion.

In the embodiment shown, the apparatus consists of an attachment means 1 in the form of a flat plate-like body, or baseplate provided with three pin bolts 5, radially displaceable in relation to the centerline 17, and adjustable to a desired position. They are arranged so that they can engage with their pointed ends against the inner edge of a wheel rim of standard model. Two of them can be screwable or otherwise adjustable in their longitudinal direction in lugs 18 placed on one side of the base plate, while the third can be displaced with the help of a bell crank 6, by means of a screw 7 accessible from the other side of the base plate.

By means of fastening screws 8, there is attached to the base plate a device 2, consisting of a plate and which is somewhat displaceable at right angles to the centerline 17 by the holes 9 for the throughgoing fastening screws 8 having a larger diameter than the screws. The displacement is achieved in practice with the help of three rollers 11 provided with handles 10 and eccentrically mounted on the attachment means 1 adjacent the device 2. In the center of the device 2 there is a guiding portion 3 for a holder 4, which holder 4 is settable to a selectable position, for attachment thereto of measuring equipment which is to be used in checking an axle, axle end or wheel adjustment. The guiding portion 3 consists of a pin projecting at right angles from the device 2, with a part-spherically shaped portion 15 attached to its free end. The holder 4 consists of a cylindrical tube or socket 13 with a flange 12, the socket being dimensioned so that it can enclose the spherical portion 15 and be pivoted or tilted about it. The tilting is carried out with the help of three adjusting screws 14 passing freely through the flange 12, and screwable into the device 2. Between this and the flange there are springs or spring washers 19 placed around the screws.

When a check is to be carried out on a vehicle axle, the vehicle is lifted so that the wheels are free from the substructure, whereafter the above described apparatus is attached by means of the pin bolts 5 to each of the wheels on the axle ends, so that the cylindrical socket 13 is approximately coaxially placed. The adjustment is checked by means of an indicating device, such as a clock-gage (i.e. dial indicator), against the cylindrical socket 13. Necessary adjustment is carried out by the device 2 being displaced by the eccentric rollers 11. Possible eccentricity of the pin 16 is finally corrected with the adjusting screws 14 until the pin 16 is no longer eccentric or out of true when the wheel is rotated. When the apparatuses at both ends of the axle have been adjusted in this way, conventional measuring instrumentation can be attached and the check carried out.

Such measurements can be done with differing measuring instrumentation according to different methods. One can for example use mirrors or projectors which are then attached to an arm fixed to the holder at right angles thereto. One can also use straight edges and angle gages, and can in such a manner find a possible deformation of either or both the axle ends.

Measurements or tracking can be carried out by a single person with the help of projectors which are attached to the holder pin 16 at right angles to it, and directed towards a measuring area which is fixed in relation to the vehicle chassis.

Within the scope of the claims, the embodiment of the apparatus can be varied without departing from the inventive idea. The apparatus can be attached with the help of magnets instead of pin bolts, and the shape of the attaching means and devices can be varied within wide limits. With necessary modifications in its implementation, the apparatus can also be used for checking elongated bodies other than vehicle axles.

I claim:
1. An apparatus for adjustment of a cylindrical holder into coaxial relation to a rotatable body, which holder is intended to be used in conjunction with measuring equipment for checking the direction or position of the rotatable body, comprising:
 a base member having a flat surface and adapted to be attached to the body to be checked, or to a part rigidly secured to said body, e.g. a vehicle wheel, with said flat surface transverse to the rotational axis of said body;
 an intermediate member mounted substantially concentrically on the base member, displaceable along said flat surface of said base member, and having guide means including a portion at least in part spherically shaped fixed thereon; and
 said cylindrical holder being in turn mounted on said intermediate member, said cylindrical holder including a socket means slidably and tiltably receiving said spherically shaped portion of said guide means for permitting tilting of said cylindrical holder about said spherically shaped portion.

2. An apparatus as claimed in claim 1, in which said base member includes a substantially flat disc having said flat surface, said intermediate member comprising a plate fixedly mounting said spherical portion and slidable on said surface of said flat disc, fastening screws engaging said base member disc and passing through clearance holes in said plate to fix said plate to said disc, the diameter of said holes exceeding that of said fastening screws to permit radial displacement of said plate on said disc upon loosening said screws.

3. An apparatus as claimed in claim 1, in which said intermediate member comprises a plate, said guide means of the intermediate member comprising a guide pin fixedly projecting from said plate and fixedly carrying said spherical portion, said cylindrical holder being cupped to receive said spherical portion and having a flange portion for connecting said holder with said plate of said intermediate member, adjusting screws engaging said plate and passing freely through said flange portion and actuable to tilt said flange portion and thus said holder as a whole into the desired tilting position about said spherical portion.

4. An apparatus as claimed in claim 2, including pin elements mounted on one side of said base member disc for attaching said base member on the body to be checked, said pin elements being displaceable and adjustable to a desired position, e.g. against a wheel rim, a bell crank extending through and pivoted on said disc and actuable by a bolt accessible from the opposite side of the disc for longitudinally displacing a said pin element.

5. Apparatus as claimed in claim 2, including camming rollers provided with handles and eccentrically mounted on said base member disc for engagement with said plate of the intermediate member and therewith for displacing said intermediate member on said base member.

6. An apparatus as claimed in claim 3, including compression springs which with said adjusting screws of said holder extend between the flange portion of said holder and the plate of said intermediate member.

7. Apparatus for adjustment of a cylindrical holder into accurate coaxial relation with a rotatable member, such as a vehicle axle or wheel, having an axis of rotation, wherein such holder is intended for use in conjunction with measuring equipment for checking the orientation of such rotatable member, comprising:
 a base member releasably securable to said rotatable member with a surface of said base member transverse to the rotation axis of said rotatable member;
 an intermediate member substantially concentrically carried by said base member and having a mounting portion adjustably displaceable along said surface of said base member transversely of said rotation axis, said intermediate member further including a portion at least in part spherically shaped, said spherical portion being fixed to and offset outward from said mounting portion and transversely displaceable therewith for centering of said spherically shaped portion with respect to said rotational axis;
 said cylindrical holder including a socket means slidably and tiltably telescoped over said spherically shaped portion of said intermediate member, and means interengaging said holder and intermediate member and actuatable for tilting said holder into alignment with said rotation axis.

8. An apparatus as claimed in claim 7, in which said intermediate member and cylindrical holder are free of connection to said rotatable member except through said base member.

9. An apparatus as claimed in claim 8, in which said cylindrical holder includes a pin fixedly extending coaxially outboard therefrom and which, by adjustive displacement of said intermediate member on said base member and adjustive tilting of said holder on said spherical portion of said intermediate member, is positionable coaxially with said rotative axes of said rotative body and effectively provides an extension of said body usable for determining the orientation of said rotative axis of said body.

* * * * *